United States Patent [19]
McNeill

[11] Patent Number: 5,488,915
[45] Date of Patent: Feb. 6, 1996

[54] INDUSTRIAL FURNACE AND METHOD OF OPERATING THE SAME

[75] Inventor: Keith R. McNeill, Sheffield, United Kingdom

[73] Assignee: Vert Investments Limited, Leeds, United Kingdom

[21] Appl. No.: 351,412

[22] Filed: Feb. 17, 1995

[30] Foreign Application Priority Data

Jun. 13, 1992 [GB] United Kingdom .................. 9212581

[51] Int. Cl.⁶ .............................. F23J 11/00; F23J 15/00
[52] U.S. Cl. ............................ 110/345; 110/348; 110/203
[58] Field of Search .................................. 95/47, 54, 96; 110/148, 203, 251, 301, 345, 348

[56] References Cited

FOREIGN PATENT DOCUMENTS

| 440085 | 8/1991 | European Pat. Off. . |
| 2243674 | 11/1991 | United Kingdom . |
| 9013522 | 11/1990 | WIPO . |

*Primary Examiner*—Henry A. Bennet
*Assistant Examiner*—Susanne C. Tinker
*Attorney, Agent, or Firm*—Cushman Darby & Cushman

[57] ABSTRACT

A method of operating an industrial furnace comprising the steps of; drawing a first gas flow of ambient air into the furnace; removing constituents of the first gas flow to increase the relative oxygen content of the remaining first gas flow, the removed constituents of the first gas flow comprising a second gas flow; firing the furnace using at least part of the remaining first gas flow as an oxidising medium; drawing waste gases from the furnace in a third gas flow; combining the second gas flow and the third gas flow; and releasing the combined second and third gas flows from the furnace.

11 Claims, 1 Drawing Sheet

INDUSTRIAL FURNACE AND METHOD OF OPERATING THE SAME

FIELD OF THE INVENTION

This invention relates to an industrial furnace and to a method of operating the same. An industrial furnace is a plant or apparatus operating an industrial process which includes as part of the process a step involving combustion with oxygen. The invention is especially concerned with, although not limited to, glass melting furnaces.

BACKGROUND TO THE INVENTION

In the field of glass melting, there has been an increasing awareness of the necessity to control the pollutant levels of emissions. This awareness has been heightened by the increasing number and severity of regulations governing these emissions. In these regulations a comparison is made between pollutant levels of input gas and compared to those of output gas released into the atmosphere. The process itself is treated as a "black box" system between those input and output values.

For example, United Kingdom patent application number GB2243674 utilises infra-sound on a vertically moving heated air sUream into which powdered glass batch has been introduced. Infra-sound has a frequency of less than about 20 Hertz. The infra-sound vibrates the heated air stream and effects heat Transfer from the air stream to the glass batch particles so that the glass batch particles are heated and the temperature of the heated air stream is reduced to a temperature below 700° C. This reduces the propensity of the air to produce NOx. Fuel is subsequently added as the heated glass batch particles and the cooled air stream move downwardly towards the crown of the furnace. The waste gas from the process is used regeneratively in a heat exchanger to effect heating of the initial air stream.

However, it is still desirable to reduce the level of pollutants emitted from the furnace relative to the levels in the ambient air drawn into the furnace (which is the standard used in the regulations referred to above).

A method has been devised to operate such a furnace which is applicable to industrial furnaces generally.

SUMMARY OF THE INVENTION

According to a first aspect of the present invention, there is provided a method of operating an industrial furnace comprising the steps of (a) drawing a first gas flow of ambient air into the furnace;

(b) removing constituents of the first gas flow to increase the relative oxygen content of the remaining first gas flow, the removed constituents from the first gas flow comprising a second gas flow;

(c) firing the furnace using at least part of the remaining first gas flow as an oxidising medium;

(d) drawing waste gas from the furnace in a third gas flow:

(e) combining the second gas flow and the third gas flow; and (f) releasing the combined second and third gas flows from the furnace.

An industrial furnace operated according to the above method will have reduced levels of pollutant emissions when comparing input gas to output gas because the return of the second gas flow to the third gas flow dilutes the relative levels of the pollutants. Furthermore, the cleaning capacity of the industrial furnace system is not wasted on gas that does not require treatment.

The gas referred to in this specification may be single constituent gas or may be a mixture.

The increased oxygen content of the oxidising medium produces higher flame temperatures and thereby increases the furnace efficiency. Waste gases are also reduced, thus requiring less waste gas cleaning.

Preferably the oxygen enriched remaining first gas flow that is used in firing the furnace has an oxygen content of at least 40% by volume, with 40% by volume being most preferable.

The third gas flow is preferably introduced into a heat exchanger in order to make use of its thermal energy. The thermal energy can be used in a combined plant and heating system within a factory or office environment.

Alternatively, the second gas flow is heated by the thermal energy from the third gas flow (the waste gas) before being introduced into the third gas flow using, for example, a pebble bed heat exchanger. The heated nitrogen increases the thermal energy of the combined second and third gas flows thereby speeding their dispersion into the atmosphere. It is to be noted that because of the technique used the third gas flow needs to be cooled before it can be cleaned efficiently which prohibits using the thermal energy of the third gas flow directly to enhance the dispersion of the waste gas.

In a second embodiment the present invention provides an industrial furnace operated in accordance with the first aspect of the invention.

In a third embodiment the present invention provides a method of operating a glass melting furnace according to the first aspect of the invention in which the furnace is fired to melt glass. The present invention has been found to be particularly advantageous in such an application.

The oxygen enriched first gas flow is preferably introduced together with the glass batch in a stream which is surrounded by burning fuel as it passes downwards through the crown of the furnace. This enables glasses having high melting temperatures to be produced.

Mixing of the glass batch, fuel and remaining first gas flow can be enhanced by infra-sound applied to the remaining first-gas flow containing the glass batch and/or the fuel.

According to a fourth aspect, the present invention also provides a glass melting furnace operated in accordance with the method of the third first aspect of the invention.

BRIEF DESCRIPTION OF THE DRAWINGS

The invention will now be described, by way of example only, with reference to the drawings that follow; in which.

DESCRIPTION OF THE PREFERRED EMBODIMENT

Figure 1:
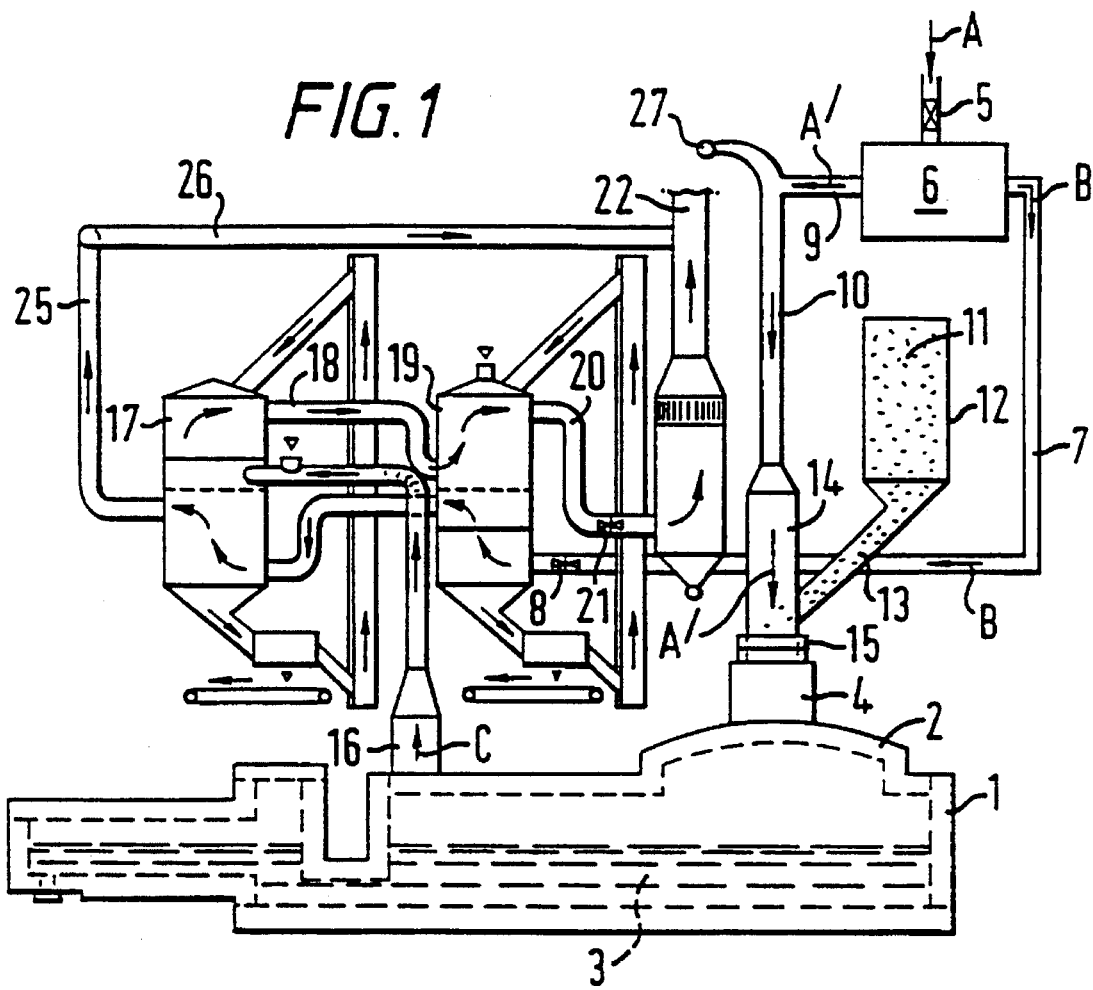
FIG. 1 is a diagrammatic side elevation of apparatus including a furnace for carrying out the method of the present invention.
Figure 2:
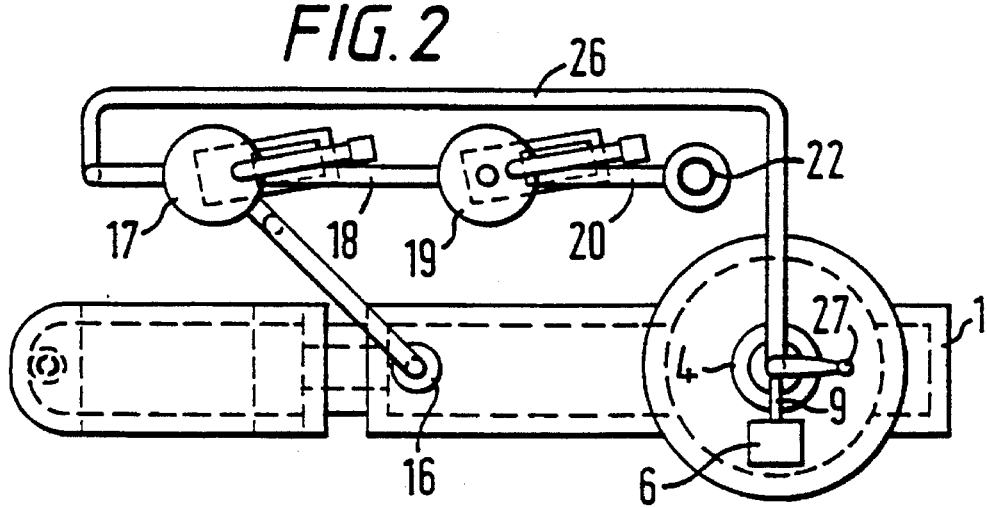
FIG. 2 is a diagrammatic plan view of the furnace shown in FIG. 1.

Referring to FIGS. 1 and 2 of the accompanying drawings, there is shown a glass-melting furnace 1 having a crown 2 and containing molten glass 3. The crown 2 of the furnace 1 supports a cylinder 4 through which heated glass batch and flame are fed into the interior of the furnace.

A first gas flow (indicated schematically at A) comprising air from ambient atmosphere is drawn by a fan 5 through a separator 6. The separator 6 is a swing absorption unit known in the field. The separator 6 removes constituents of the first gas flow A to increase the relative oxygen content of the remainder of the first gas flow (indicated schematically at A'). The removed constituents of the first gas flow comprise a second gas flow (indicated schematically at B). For instance, the approximate ratios of oxygen to non-oxygen (primarily nitrogen) gases in air is 1:4. If 50% of the non-oxygen gases are removed the approximate ratio becomes 1:2. The second gas flow B is drawn along ducting 7 by a fan 8. The remaining first gas flow A is directed from the separator 6 along ducting 9 towards the crown 2 down a vertical cylinder 10, which is concentric with cylinder 4 above the crown of furnace 1.

Glass batch 11 in powder form is fed from a hopper 12 through a channel 13 into the remaining first gas flow A' in a wider cylinder 14 which is in fluid communication with cylinder 10.

An infra-sound generator 27 generates sound waves at a frequency of 15–20 Hertz at around 140 decibels. These sound waves are passed directly down the cylinder 10, through the wider cylinder 14 and further through cylinder 4 into the interior of the furnace 1 where the sound waves are reflected from the surface of the molten glass 3.

The infra-sound assists in the mixing of the remaining first gas flow A' with the glass batch 11 and fuel. The use of infra-sound is similar to that described in published United Kingdom patent application number GB 2 243 674. However, in the present invention the remaining first gas flow A' cannot be superheated as described in GB 2 243 674 because of the dangers associated with the higher oxygen content.

The stream of glass batch 11 and remaining first gas flow A' passes downwardly from cylinder 10 to cylinder 4, into which fuel, for example gas or oil, is injected vertically downwardly through vertical inlets in a part 15, which surrounds the lower end of cylinder 10 and enables fuel to be injected to mix with the remaining first gas flow A' and glass batch 11 passing through cylinder 4 where fuel ignites as described in published international patent publication number WO 90/13522. As the glass batch 11 passes down through cylinder 4, the burning fuel in cylinder 4 raises the temperature of the glass batch 11 substantially to the melting temperature of the components of the glass batch and the flame and heated batch both contact the surface of molten glass 3 in furnace 1. The direct flame contact upon thinly distributed batch on the hot molten surface in furnace 1 encourages melting and maturing of the batch into hot molten glass.

Waste gases comprising a third gas flow (indicated schematically at C) exit from the furnace 1 through a vertical duct 16 and are drawn through upper part of heat exchanger 17, ducting 18, upper part of heat exchanger 19 and further ducting 20 by a fan 21 to The base of chimney stack 22 within which filtration of any remaining pollutants occurs.

The heat exchangers 17 and 19 each comprise a moving pebble bed regenerator based on the pebble bed heat exchanger described by C. L. Norton Jr. in the journal of the American Ceramic Society, Volume 29, (1946) No 7, pages 187–193. The pebble bed regenerators 17 and 19 may additionally be used to remove oxides of nitrogen (NOx) and oxides of sulphur (SOx) by addition of ammoniacal water and alkali respectively, as described in published United Kingdom Patent Application No GB 2 243 674. However, by use of the preferred method in accordance with the present invention, the quantities of NOx produced on combustion may be so small that a special treatment with ammoniacal water to remove NOx from the waste gases is not required. The second gas flow B (being the removed constituents of the first input gas A) is drawn through the ducting 7 through a lower part of pebble bed regenerator 19 and thereafter through a lower part of pebble bed regenerator 17 so that the second gas flow B acquires heat in the pebble bed regenerators 19 and 17. The second gas flow B is heated during its passage through the pebble bed regenerators 19 and 17 by taking heat from the heated pebbles moving under gravity in those pebble bed regenerators so that the second gas flow B is heated to a temperature of the order of 1200° C. The heated second gas flow B is then fed through ducts 25 and 26 and introduced into the third gas flow C (being the waste gases from the furnace) after it has been filtered.

Thus, as illustrated in FIGS. 1 and 2, the invention provides a method of operating an industrial furnace 1 comprising the steps of drawing a first gas flow A of ambient air into the furnace 1. Constituents of the first gas flow A are removed to increase its relative oxygen content. The removed constituents from the first gas flow A comprise a second gas flow B. The furnace 1 is fired, using at least part of the remaining first gas flow A' as an oxidising medium. Waste gases are drawn from the furnace in a third gas flow C. The second gas flow B and the third gas flow C are combined and released from the furnace.

Were the third gas flow C to be vented from the chimney stack 22 immediately after filtration, it would be at a temperature of about 60° C. This would provide very little thermal lift to assist in the dispersion of any remaining waste gases, especially as the vented gases would be supersaturated with water, which could result in localised concentrations of pollutants.

The venting of the combined second and third gas flows B and C respectively allows the waste heat in the third gas flow C to be used to assist dispersion by providing additional thermal lift.

The return of the second gas flow B dilutes the third gas flow C thus reducing the levels of pollutants (by volume) vented from the chimney stack 22 and assists in meeting target pollutant levels when compared with ambient air in the locality.

Alternatively the thermal energy is the third gas flow C can be used to power a turbine and/or a combined plant and heating system within a factory or office environment. When the third gas flow C is to be used in a combined heating system the other gas introduced into the pebble bed heat exchangers 17 and 19 would be an additional gas flow pumped to the site to be heated. If the third gas flow C is to be used to produce power then for instance, the heat exchangers 17 and 19 and could be replaced by a steam turbine to produce electricity for the plant or for another site. In both these cases the second gas flow B is combined with the third gas flow C without making use of the thermal energy originally in the third gas flow C. The dilution of the third gas flow C by the second gas flow B is still achieved and is regarded as highly advantageous.

I claim:

1. A method of operating an industrial furnace comprising the steps of:
   (a) drawing a first gas flow of ambient air having an oxygen content into the furnace;
   (b) removing constituents of the first gas flow to increase the relative oxygen content thereof and thereby provide an oxygen enriched gas flow, the removed constituents from the first gas flow comprising a second gas flow;

(c) firing the furnace using at least part of the oxygen enriched gas flow as an oxidising medium;

(d) drawing waste gas from the furnace in a third gas flow;

(e) combining the second gas flow and the third gas flow; and (f) releasing the combined second and third gas flows from the furnace.

2. A method according to claim 1 in which the oxygen enriched gas flow that is used in firing the furnace has an oxygen content of at least 40% by volume.

3. A method according to claim 2 in which the oxygen content of the oxygen enriched gas flow that is used in firing the furnace is 40% by volume.

4. A method according to any preceding claim 1 in which the third gas flow is introduced into a heat exchanger in order to make use of its thermal energy.

5. A method according to claim 1 in which the second gas flow is heated by the thermal energy exchanged from the third gas flow before being introduced into the third gas flow.

6. A method according to claim 5 in which the second gas flow is heated using a pebble bed heat exchanger.

7. A method according to claim 1 in which the furnace is a glass-melting furnace which is fired to melt glass.

8. A method according to claim 7 in which the oxygen enriched gas flow is introduced together with the glass batch in a stream which is surrounded by burning fuel as it passes downwards through the crown of the furnace.

9. A method according to claim 7 in which mixing of the glass batch, fuel and oxygen enriched gas flow is enhanced by infra-sound applied to the oxygen enriched gas flow containing the glass batch and/or the fuel.

10. An industrial furnace apparatus comprising:

(a) a first gas inlet through which a first gas flow of ambient air is drawn into a first gas path;

(b) a separator in the first gas path downstream of the inlet to separate the flow into two gas flows, a remaining gas flow of increased oxygen content and a second gas flow, such that the remaining gas flow is fed into a remaining gas path, and the second gas flow is fed into a second gas path;

(c) the remaining gas path extending to a furnace inlet to be fed into the furnace to fire the furnace as an oxidising flow;

(d) a furnace outlet through which waste gas is drawn out of the furnace into a third gas path;

(e) a combinet coupled to the second and third gas paths to combine the second and third gas flows and feed the combined gases to a gas release for releasing the combined flow from the apparatus.

11. A furnace apparatus according to claim 10 in which the furnace is a glass melting furnace.

* * * * *